United States Patent
Han et al.

(10) Patent No.: US 9,402,251 B2
(45) Date of Patent: Jul. 26, 2016

(54) ENHANCED PHYSICAL DOWNLINK CONTROL CHANNEL SCRAMBLING AND DEMODULATION REFERENCE SIGNAL SEQUENCE GENERATION

(71) Applicant: Intel Corporation, Santa Clara, CA (US)

(72) Inventors: Seunghee Han, Cupertino, CA (US); Yuan Zhu, Beijing (CN); Xiaogang Chen, Beijing (CN); Yi Qin, Beijing (CN); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 129 days.

(21) Appl. No.: 14/127,118

(22) PCT Filed: Aug. 5, 2013

(86) PCT No.: PCT/US2013/053653
§ 371 (c)(1),
(2) Date: Dec. 17, 2013

(87) PCT Pub. No.: WO2014/022860
PCT Pub. Date: Feb. 6, 2014

(65) Prior Publication Data
US 2014/0355531 A1    Dec. 4, 2014

Related U.S. Application Data

(60) Provisional application No. 61/679,627, filed on Aug. 3, 2012, provisional application No. 61/692,597, filed on Aug. 23, 2012, provisional application No. 61/707,784, filed on Sep. 28, 2012, provisional application No. 61/721,436, filed on Nov. 1, 2012.

(51) Int. Cl.
*H04W 72/04* (2009.01)
*H04L 27/26* (2006.01)
(Continued)

(52) U.S. Cl.
CPC ......... *H04W 72/042* (2013.01); *H04J 11/0036* (2013.01); *H04L 1/0072* (2013.01); *H04L 5/0051* (2013.01); *H04L 27/20* (2013.01); *H04L 27/2613* (2013.01); *H04L 27/2692* (2013.01)

(58) Field of Classification Search
None
See application file for complete search history.

(56) References Cited

U.S. PATENT DOCUMENTS

2011/0077038 A1    3/2011    Montojo et al.
2011/0085503 A1    4/2011    Nam et al.
(Continued)

FOREIGN PATENT DOCUMENTS

JP    2012514875 A    6/2012
KR    20080022065 A    3/2008
(Continued)

OTHER PUBLICATIONS

Sesia et al., "LTE: The UMTS Long Term Evolution; From Theory to Practice; Second Edition, Section 8.2 Design of Reference Signals in the LTE Downlink", John Wiley & Sons Ltd. Publishing, (Mar. 2011) 11 pages.

(Continued)

*Primary Examiner* — Christopher Crutchfield
*Assistant Examiner* — Tito Pham
(74) *Attorney, Agent, or Firm* — Schwabe, Williamson & Wyatt, P.C.

(57) ABSTRACT

Methods, apparatuses, and systems are described to provide enhanced physical downlink control channel scrambling and demodulation reference signal sequence generation.

6 Claims, 10 Drawing Sheets

(51) Int. Cl.
  *H04J 11/00* (2006.01)
  *H04L 5/00* (2006.01)
  *H04L 27/20* (2006.01)
  *H04L 1/00* (2006.01)

(56) References Cited

U.S. PATENT DOCUMENTS

| | | | |
|---|---|---|---|
| 2011/0103250 A1 | 5/2011 | Li et al. | |
| 2012/0044921 A1* | 2/2012 | Chung | H04L 5/0053 370/338 |
| 2012/0188988 A1 | 7/2012 | Chung et al. | |
| 2012/0190388 A1* | 7/2012 | Castleman | H04L 12/581 455/466 |
| 2013/0051214 A1* | 2/2013 | Fong | H04W 24/10 370/216 |
| 2013/0195275 A1* | 8/2013 | Koivisto | H04L 1/0061 380/287 |
| 2013/0287064 A1* | 10/2013 | Seo | H04J 13/18 375/144 |
| 2014/0079009 A1* | 3/2014 | Liu | H04W 8/26 370/329 |

FOREIGN PATENT DOCUMENTS

| | | |
|---|---|---|
| KR | 20110126034 A | 11/2011 |
| WO | 2009098960 A1 | 8/2009 |
| WO | 2010/079728 A1 | 7/2010 |
| WO | 2011041552 A1 | 4/2011 |

OTHER PUBLICATIONS

Notification Concerning Transmittal of Copy of International Preliminary Report on Patentability mailed Feb. 12, 2015 from International Application No. PCT/US2013/053653.
International Search Report and Written Opinion mailed Nov. 21, 2013 from International Application No. PCT/US2013/053653.
Hitachi Ltd., "DMRS scrambling sequence for ePDCCH," 3GPP TSG RAN WG1 Meeting #69, R1-122707, Prague, Czech Republic, May 21-25, 2012, 3 pages.
LG Electronics, "Further discussion on DMRS for ePDCCH," 3GPP TSG RAN WG1 Meeting #69, R1-122886, Prague, Czech Republic, May 21-25, 2012, 5 pages.
Nokia Siemens Networks, Nokia Corportation, "Remaining issues in DMRS for CoMP," 3GPP TSG-RAN WG1 Meeting #69, R1-122413, Prague, Czech, May 21-25, 2012, 3 pages.
3GPP, "Technical Specification Group Radio Access Network; Evolved Universal Terrestrial Radio Access (E-UTRA); Physical layer procedures (Release 10)," 3GPP TS 36.213 V10.5.0 (2012-03), Lte Advanced, 125 pages.
3GPP, "Technical Specification Group Radio Access Network; Evolved Universal Terrestrial Radio Access (E-UTRA); Physical Channels and Modulation (Release 10)," 3GPP TS 36.211 V10.5.0 (2012-06), Lte Advanced, 101 pages.
Office Action issued Jul. 1, 2015 from Australian Patent Application No. 2013296189.
Office Action issued Aug. 6, 2015 from Korean Patent Application No. 2014-7036962.
Office Action issued Jul. 1, 2015 from Australian Patent Application No.
ETRI, "Remaining issues for downlink DM RS sequence initialization," 3GPP TSG RAN WG1 Meeting #68bis, R1-121405, Mar. 26-30, 2012, Jeju, Korea, 3 pages.
Pantech, "DM RS sequence configuration for ePDCCH," 3GPP TSG RAN Working Group 1 Meeting #69, R1-122455, May 21-25, 2012, Prague, 4 pages.
Extended European Search Report issued Mar. 3, 2016 from European Patent Application No. 13825009.7.
Examiner's Report issued Mar. 14, 2016 from Canadian Patent Application No. 2,878,379, 4 pages.
Notice of Final Rejection issued Apr. 22, 2016 from Korean Patent Application No. 2014-7036962, 5 pages.
Office Action issued Feb. 9, 2016 from Japanese Patent Application No. 2015-521889, 19, pages.
Texas Instruments, "On multiplexing of ePDCCH with PDSCH," 3GPP TSG RAN WG1 Meeting #67, R1-113792, Agenda item: 7.3.2, Nov. 14-18, 2011, San Francisco, USA, 5 pages.

* cited by examiner

ENHANCED PHYSICAL DOWNLINK CONTROL CHANNEL SCRAMBLING AND DEMODULATION REFERENCE SIGNAL SEQUENCE GENERATION

CROSS REFERENCE TO RELATED APPLICATIONS

The present application claims priority to: U.S. Provisional Patent Application No. 61/679,627 filed 3 Aug. 2012 and entitled "Advanced Wireless Communication Systems and Techniques"; U.S. Provisional Application No. 61/692,597 filed 23 Aug. 2012 and entitled "Advanced Wireless Communication Systems and Techniques"; U.S. Provisional Patent Application No. 61/707,784 filed 28 Sep. 2012 and entitled "Advanced Wireless Communication Systems and Techniques"; and U.S. Provisional Patent Application No. 61/721,436 filed 1 Nov. 2012 and entitled "Advanced Wireless Communication Systems and Techniques," the entire disclosures of which are hereby incorporated by reference in their entireties.

FIELD

Embodiments of the present invention relate generally to wireless networks and more particularly to enhanced physical downlink control channel scrambling and demodulation reference signal sequence generation.

BACKGROUND

In existing 3GPP LTE networks, downlink control information (DCI) may be scrambled using a scrambling sequence that is specific to a user equipment (UE). However, there may be situations in which a UE other than the target UE successfully de-scrambles and decodes DCI that was directed to the target UE. In these situations, the UE may incorrectly act on the DCI causing errors or other inefficiencies.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for enhanced physical downlink control channel scrambling and demodulation reference signal sequence generation.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
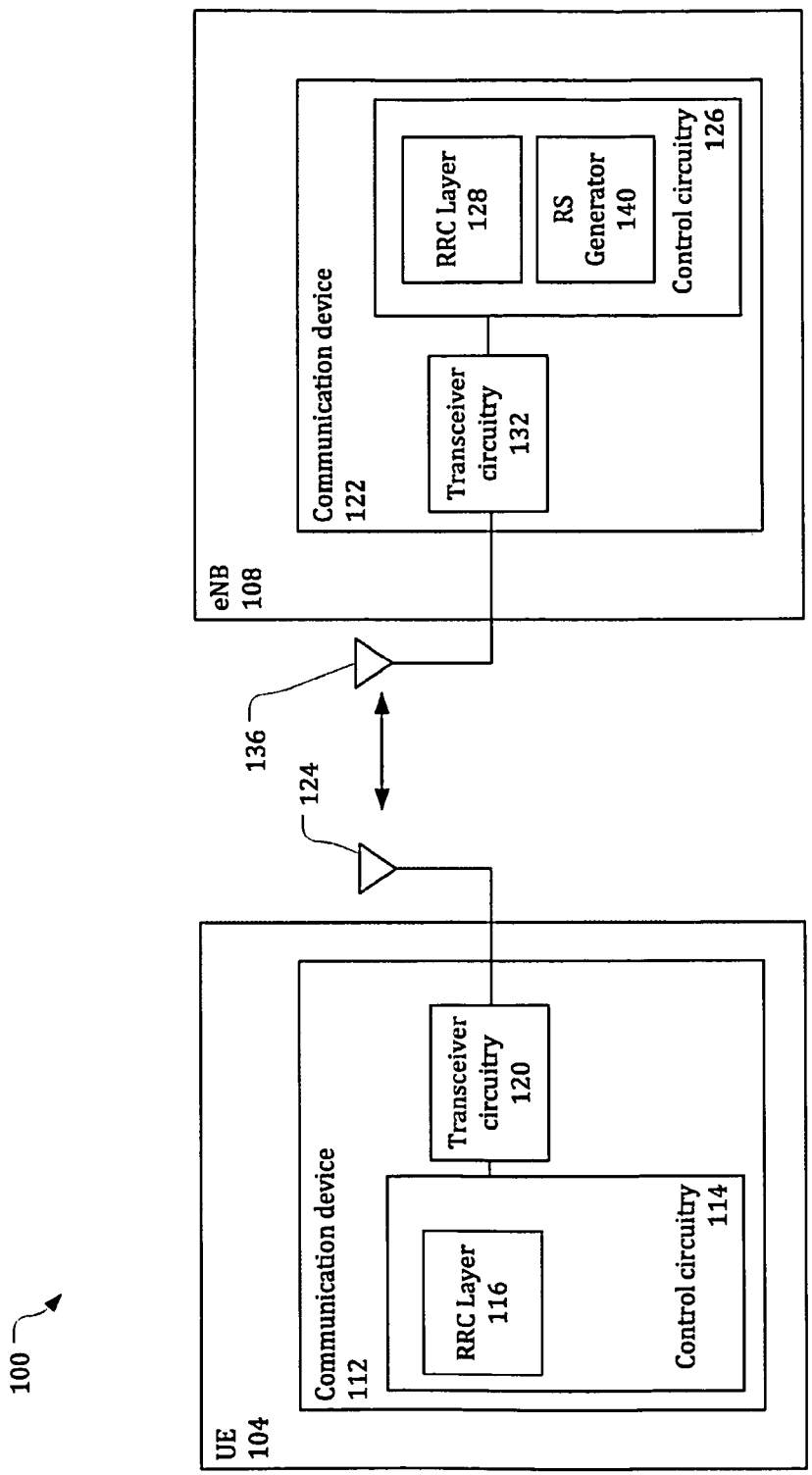
FIG. 1 schematically illustrates a high-level example of a network system comprising a UE and an eNB, in accordance with various embodiments.

FIG. 1 schematically illustrates a network environment 100 in accordance with various embodiments. The network environment 100 includes a user equipment (UE) 104 wirelessly coupled with an evolved Node B (eNB) 108 of a radio access network (RAN) via an over-the-air (OTA) interface. The RAN may be part of a 3GPP LTE Advanced (LTE-A) network and may be referred to as an evolved universal terrestrial radio access network (EUTRAN). In other embodiments, other radio access network technologies may be utilized.

The UE 104 may include a communication device 112 that implements various communication protocols in order to effectuate communication with the eNB 108. The communication device 112 may be a chip, chipset, or other collection of programmed and/or preconfigured circuitry. In some embodiments, the communication device 112 may include or be part of baseband circuitry, a radio-frequency circuitry, etc.

The communication device 112 may include control circuitry 114 that performs various control operations related to communication over the RAN. These control operations may include, determining uplink control information, resource allocation, etc. The control circuitry 114 may include radio resource control layer 116 and may be coupled with, and control operation of, transceiver circuitry 120, which is, in turn, coupled with one or more antennas 124.

The eNB 108 may have similar components such as communication device 122, control circuitry 126, RRC layer 128, transceiver circuitry 132, and one or more antennas 136. The control circuitry 124 may also include a reference signal (RS) generator 140.

Figure 2:
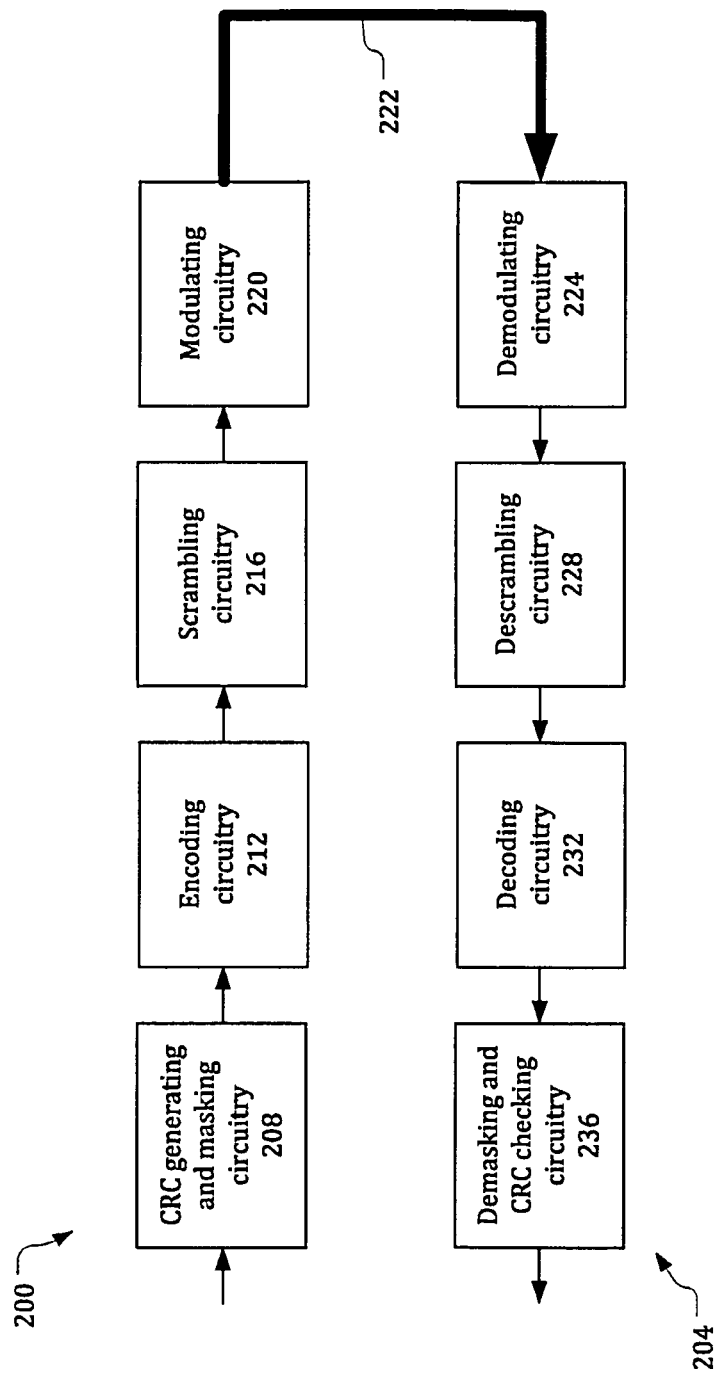
FIG. 2 illustrates components of a UE and an eNB, in accordance with various embodiments.

FIG. 2 illustrates Tx circuitry 200 and Rx circuitry 204, which may be included in transceiver circuitry 132 and 120, respectively, in accordance with some embodiments. The Tx circuitry 200 and Rx circuitry 204 may be used to transmit and receive enhanced physical downlink control channel (EP-DCCH) transmissions. EPDCCH transmissions may carry downlink control information that includes resource assignments and other control information for a UE or a group of UEs. Each EPDCCH transmission may include one or more enhanced control channel elements (ECCEs).

The Tx circuitry 200 may include a cyclic redundancy check (CRC) generating and masking circuitry 220 that may receive bits, for example, downlink control information (DCI) bits, generate CRC bits and append the CRC bits to the DCI bits, and mask the DCI+CRC bit sequence. The masking of the DCI+CRC bit sequence may be based on a radio network temporary identity (RNTI) of a user equipment that is the intended recipient of the ePDCCH transmission. In one embodiment, CRC bits may be added to DCI bits and the resulting sequence may be masked based on $RNTI_1$, which is associated with $UE_1$.

The Tx circuitry 200 may further include encoding circuitry 212 to receive the masked bit sequence and encode the sequence with a selected channel encoding scheme. The channel encoding scheme may be a Reed Muller (RM) code, a dual RM code, a quad RM code, a tail-biting convolutional code (TBCC), a turbo code, etc. The encoding circuitry 212 may also perform rate matching, for example, virtual circular buffer rate matching. Given a 56 DCI bits, 16 CRC bits, and a 1/2 code rate, the encoding circuitry 212 may output a 144-bit encoded sequence.

The Tx circuitry 200 may further include scrambling circuitry 216 to receive and scramble the encoded bit sequence to provide a scrambled bit sequence. The scrambling circuitry scrambling may be based on a cell identifier.

The encoded bit stream, may be scrambled according to $$\tilde{b}(i)=(b(i)+c(i)) \bmod 2, \quad \text{Equation 1}$$

where $\tilde{b}(i)$ is the scrambled bit sequence, $b(i)$ is the encoded bit sequence, and $c(i)$ is a scrambling sequence, e.g., a pseudo-random sequence (for example, a Gold sequence, pseudo-noise (PN) sequence, Kasami sequence, etc.).

The scrambling circuitry 216 may include a scrambling sequence generator that provides the scrambling sequence. The scrambling sequence generator may be initialized with an initialization seed $c_{int}$ at a start of each subframe to generate the scrambling sequence $c(i)$. The initialization seed may be a cell-specific seed given by:

$$c_{int}=\lfloor n_s/2 \rfloor *2^9+N_{ID}^{cell}, \quad \text{Equation 2}$$

where $n_s$ is a slot number within a radio frame varying from 0 to 19, and $N_{ID}^{cell}$ may be an initialization seed parameter such as a cell identifier.

In coordinated multipoint (CoMP) scenarios, the initialization seed parameter may be a virtual cell identifier, for example, $N_{ID}^{ePDCCH}$, and may be assigned by a high layer. For example, RRC layer 128 may configure scrambling circuitry 216 with the virtual cell identifier. In embodiments in which more than one EPDCCH set is used, for example, two EPDCCH sets, the configured virtual cell identifier may be given as $N_{ID,i}^{ePDCCH}$ for the EPDCCH transmission in EPDCCH set i. Thus, the initialization seed parameter corresponds to the EPDCCH set. In some embodiments, the virtual cell ID for EPDCCH set i may be the same as what is used for UE-specific RS initialization associated with EPDCCH.

In some embodiments, if a virtual cell ID is not configured, the initialization seed parameter may be a physical cell identifier.

The block of scrambled bits $\tilde{b}(0), \ldots, \tilde{b}(M_{bit}-1)$ may be modulated by modulating circuitry 220 using, for example, QPSK modulation. This may result in a block of complex-valued symbols $d(0), \ldots, d(M_{symb}-1)$ where $M_{symb}=M_{bit}/2=2N_{sc}^{RB}$, where $N_{sc}^{RB}$ is a number of subcarriers in a resource block and may equal 12. The complex-valued symbols may be transmitted, over channel 222, to the Rx circuitry 204.

The block of complex-valued symbols may be received by demodulating circuitry 224 of the Rx circuitry 204. Demodulating circuitry 224 may demodulate the block of complex-valued symbols to provide a block of scrambled bits.

The Rx circuitry 204 may further include descrambling circuitry 228 coupled with the demodulating circuitry 224 to receive and descramble the block of scrambled bits to provide the encoded bit sequence. The descrambling circuitry 228 may descramble the block of scrambled bits based on cell ID. If the cell ID is a virtual cell ID it may be predetermined or be provided to the descrambling circuitry 228 by RRC layer 116. If the cell ID is a physical cell ID, the control circuitry 114 may derive the value based on primary and secondary synchronization signals broadcast by the eNB 108. If the cell ID used by the descrambling circuitry 228 matches the cell ID used by the scrambling circuitry 216, the bits will be properly descrambled.

The Rx circuitry 204 may further include decoding circuitry 232 coupled with the descrambling circuitry 228 to receive and decode the encoded bit sequence to provide the DCI+CRC bit sequence.

The Rx circuitry 204 may further include demasking and CRC checking circuitry 236 coupled with the decoding circuitry 232 to de-mask the bit sequence and remove and check the CRC bits. The de-masking may be based on an RNTI of the receiving device, for example, the UE 104. If the RNTI matches that used in the masking operation, the bit sequence may be regarded properly. The DCI bits may then be transmitted to higher-layers of, for example, the control circuitry 114.

Using the cell ID as the initialized seed, rather than a UE identifier, such as RNTI, may result in less false alarms that could result from a UE that is not the intended recipient correctly descrambling and decoding DCI.

While the description details DCI transmission on EPDCCH a similar transmit process, including scrambling based on cell identifier, may be used for other transmissions such as, but not limited to, transmission of user-specific demodulation reference signals (UE-RS) associated with the EPDCCH.

The RS generator 140 may generate a UE-RS that may be transmitted from an antenna port at the eNB 108 to enable the UE 104 to derive a channel estimate for the data transmitted by the antenna port. An antenna port may correspond to one or more physical transmit antennas; however, a signal transmitted by an antenna port may be designed such that it is not further deconstructed by a receiver.

In some situations, interference measured from a UE-RS may not match interference experienced by EPDCCH resource elements (REs) subsequently transmitted by the same antenna port. This may be due to frequency division multiplexed (FDM)/code division multiplexed (CDM) ECCEs being associated with completely overlapped FDM/CDM UE-RS.

Inter-cell interference mismatch may be explained as follows. Assume cell A uses UE-RS antenna port 7 to transmit ECCE 0 to UE 1 and a neighbor cell B uses UE-RS antenna port 8 to transmit eCCE 1 to UE 2. The received signals from a pair of orthogonal cover code having length of 2, (OCC-2) REs are listed as:

$$\begin{cases} y_0 = x_0 * 1 * H_0 + x_2 * 1 * H_1 \\ y_1 = x_1 * 1 * H_0 + x_3 * (-1) * H_1 \end{cases}$$ Equation 3 where $x_0$ and $x_1$ are reference signal sequences on first and second UE-RS REs for cell A, $x_2$ and $x_3$ are reference signal sequences on first and second UE-RS REs for cell B, $H_0$ and $H_1$ are channels from cell A and cell B to UE 1, and $y_0$ and $y_1$ are the received signals on the first and second UE-RS REs.

In order to remove the potential mismatched intra-cell interference, UE 1 may first descramble, using descrambling circuitry 228, for example, and then do OCC-2 decoding, using decoding circuitry 232, for example, by using $$y = y_0 * 1 * x_0^T + y_1 * 1 * x_1^T = H_0 + (x_2 * x_0^T - x_3 * x_1^T) H_1.$$ Equation 4

Figure 3:
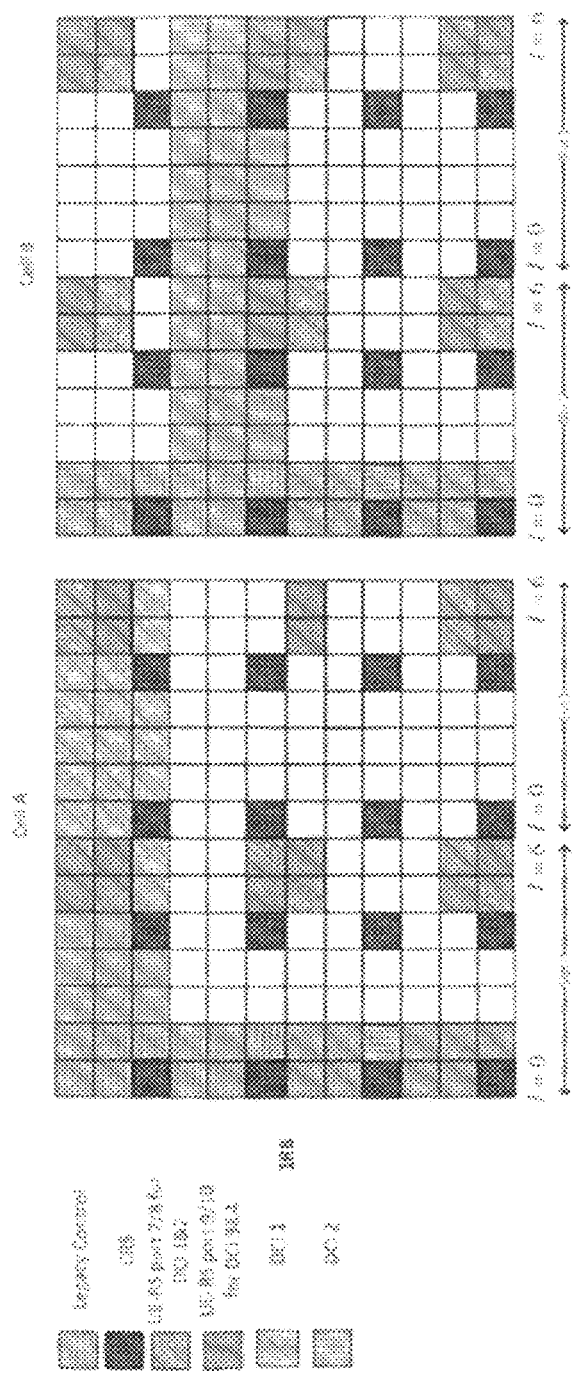
FIG. 3 illustrates subframes for cell A and B, in accordance with various embodiments.

Based on Equation 4 and FIG. 3, which illustrates subframes for cell A and cell B in accordance with an embodiment, it may be seen that the DCI may not experience intercell interference but UE-RS of Equation 4 includes the inter-cell interference, represented by the term "$(x_2 * x_0^T - x_3 * x_1^T) H_1$". This results in interference mismatch and may degrade performance.

The potential mismatched inter-cell interference may be removed if the following equation is satisfied:

$$x_2 * x_0^T - x_3 * x_1^T = 0.$$ Equation 5

Equation 5 may be satisfied when a common scrambling sequence is used for both REs of a pair of OCC-2 UE-RS REs, which may result in $x_0 = x_1$ and $x_2 = x_3$.

When using the same scrambling sequence for both REs of a pair of OCC-2 UE-RS REs, for an antenna port p in a physical resource block $n_{PRB}$ assigned for an associated EPD-CCH, the modulating circuitry 220 may map at least part of a reference signal sequence r(m) to complex-valued modulation symbols $a_{k,l}^{(p)}$ in a subframe, using normal cyclic prefix according to:

$$a_{k,l}^{(p)} = w_p(l') \cdot r\left(3 \cdot \left\lfloor \frac{l'}{2} \right\rfloor \cdot N_{RB}^{max,DL} + 3 \cdot n_{PRB} + m'\right)$$ Equation 6 where, $N_{RB}^{max,DL}$ is a maximum number of downlink resource blocks given system bandwidth;

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, 8, or 9*} \\ l' \bmod 2 + 2 + 3\lfloor l'/2 \rfloor & \text{if in a special subframe with configuration 1, 2, 6, or 7*} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7*} \\ 0, 1 & \text{if } n_s \bmod 2 = 0 \text{ and not in special subframe with configuration 1, 2, 6, or 7*} \\ 2, 3 & \text{if } n_s \bmod 2 = 1 \text{ and not in special subframe with configuration 1, 2, 6, or 7*} \end{cases}$$

$$m' = 0, 1, 2$$

*See Table 4.2-1 of *3GPP TS* 36.211 v10.5.0(June 2012) for special subframe configurations The sequence $\overline{w}_p(i)$ for normal cyclic prefix may be given by Table 1.

TABLE 1

| Antenna port p | $[\overline{w}_p(0) \; \overline{w}_p(1) \; \overline{w}_p(2) \; \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Given that Equation 6 uses the same scrambling sequence for a pair of OCC-2 UE-RS REs, there may be some impact on inter-cell interference randomization on UE-RS REs. This may be overcome by applying a UE-RS port-specific scrambling sequence depending on how many UE-RS antenna ports $n_p$ are used. This may result in Equation 6 being modified to be:

$$a_{k,l}^{(p)} = w_p(l') \cdot r\left(\begin{matrix}(p \bmod n_p) \cdot 6 \cdot N_{RB}^{max,DL} \cdot 3 \cdot \\ \left\lfloor \frac{l'}{2} \right\rfloor \cdot N_{RB}^{max,DL} + 3 \cdot n_{PRB} + m'\end{matrix}\right).$$ Equation 7

Note that a maximum pseudo-random sequence length may be defined for a UE-RS as $12 * N_{RB}^{max,DL}$. In order to meet the antenna port specific length of 8 UE-RS antenna ports in Equation 7, the maximum sequence length of one embodiment may be $12 * n_p * N_{RB}^{max,DL}$. That is, the UE-RS sequence r(m) can be generalized to cover up to 8 antenna ports, for example, $n_p = 8$, as follows:

$$r(m) = \frac{1}{\sqrt{2}}(1 - 2 * c(2m)) + j\frac{1}{\sqrt{2}}(1 - 2 * c(2m+1)),$$ Equation 8 where $$m = \begin{cases} 0, 1, \ldots, 96 N_{RB}^{max,DL} - 1 & \text{normal cyclic prefix} \\ 0, 1, \ldots, 128 N_{RB}^{max,DL} - 1 & \text{extended cyclic prefix} \end{cases}.$$

The pseudo-random sequence c(i) may be defined as described above and in some embodiments the scrambling sequence generator of the scrambling circuitry 216 may be initialized with:

$$c_{int} = \left(\left\lfloor \frac{n_s}{2} \right\rfloor + 1\right) * (2N_{ID}^{cell} + 1) * 2^{16} + n_{SCID}, \qquad \text{Equation 9}$$

where $N_{ID}^{cell}$ is a physical cell ID or a virtual cell ID and may indicate one of multiple transmission points when used in a CoMP scenario. For example, EPDCCH set 0 may be transmitted from cell #0 with $N_{ID}^{cell\#0}$ and EPDCCH set 1 may be transmitted from cell #1 with $N_{ID}^{cell\#1}$. In another example, EPDCCH set 0 and EPDCCH set 1 may be transmitted from cell #0 (or cell #1) with $N_{ID}^{cell\#0}$ (or $N_{ID}^{cell\#1}$). The value of $n_{SCID}$ may be a constant value (for example, 0, 1, 2, ...). For a PDSCH transmission on antenna ports 7 or 8, $n_{SCID}$ may be given by a DCI format 2B or 2C associated with the PDSCH transmission. In the case of DCI format 2B, $n_{SCID}$ may be indicated by a scrambling identity field.

If number of antenna ports is up to 2 (for example, antenna port 7 and 8), for example, $n_p = 2$, the UE-RS sequence r(m) may be given by Equation 8 where $$m = \begin{cases} 0, 1, \ldots, 24 N_{RB}^{max,DL} - 1 & \text{normal cyclic prefix} \\ 0, 1, \ldots, 32 N_{RB}^{max,DL} - 1 & \text{extended cyclic prefix.} \end{cases}$$

Figure 4:
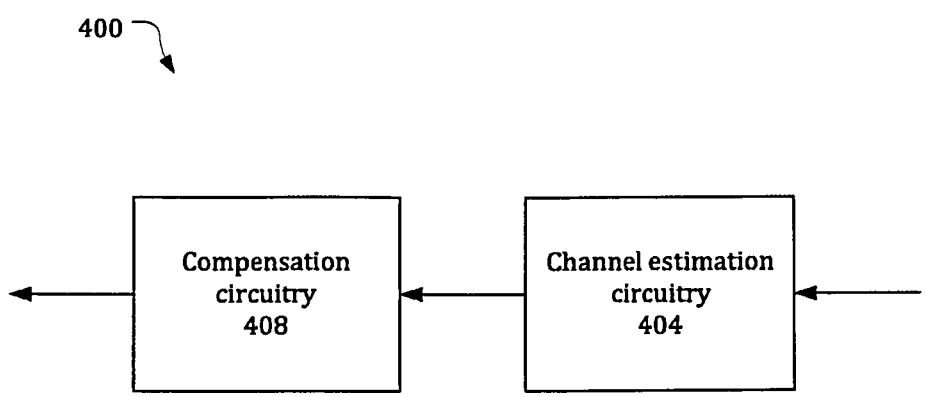
FIG. 4 illustrates receive circuitry in accordance with various embodiments

FIG. 4 illustrates Rx circuitry 400 in accordance with some embodiments. The Rx circuitry 400 may include a channel estimation circuitry 404 and compensation circuitry 408 and may be configured to address orthogonality issues that may be observed with the residual interference when a UE tries to estimate a channel for an antenna port by a de-spreading operation from OCC. Embodiments described below may reduce the residual interference.

Figure 5:
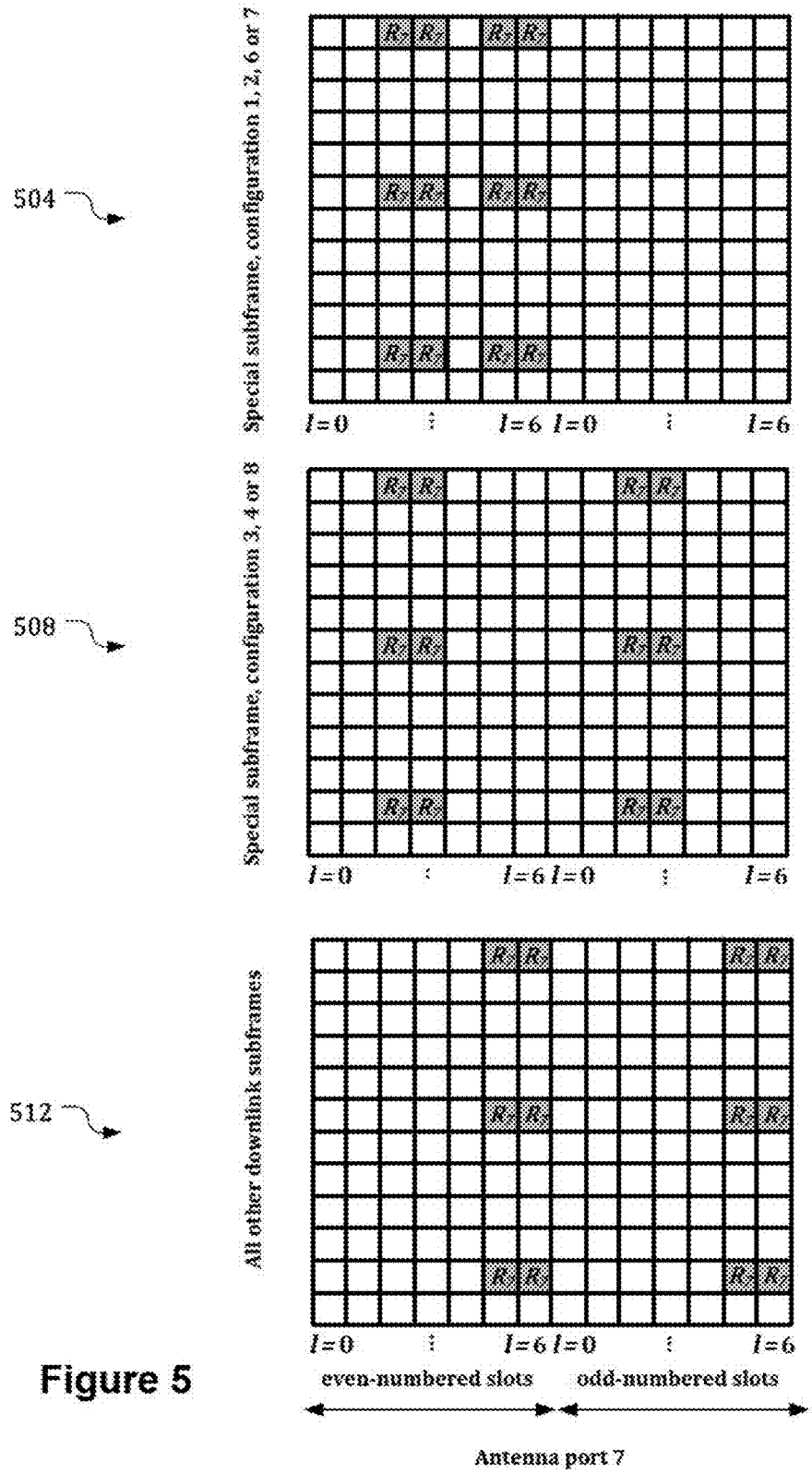
FIGS. 5-7 illustrate example UE-RS patterns for an EPDCCH using normal CP, in accordance with various embodiments.
Figure 6:
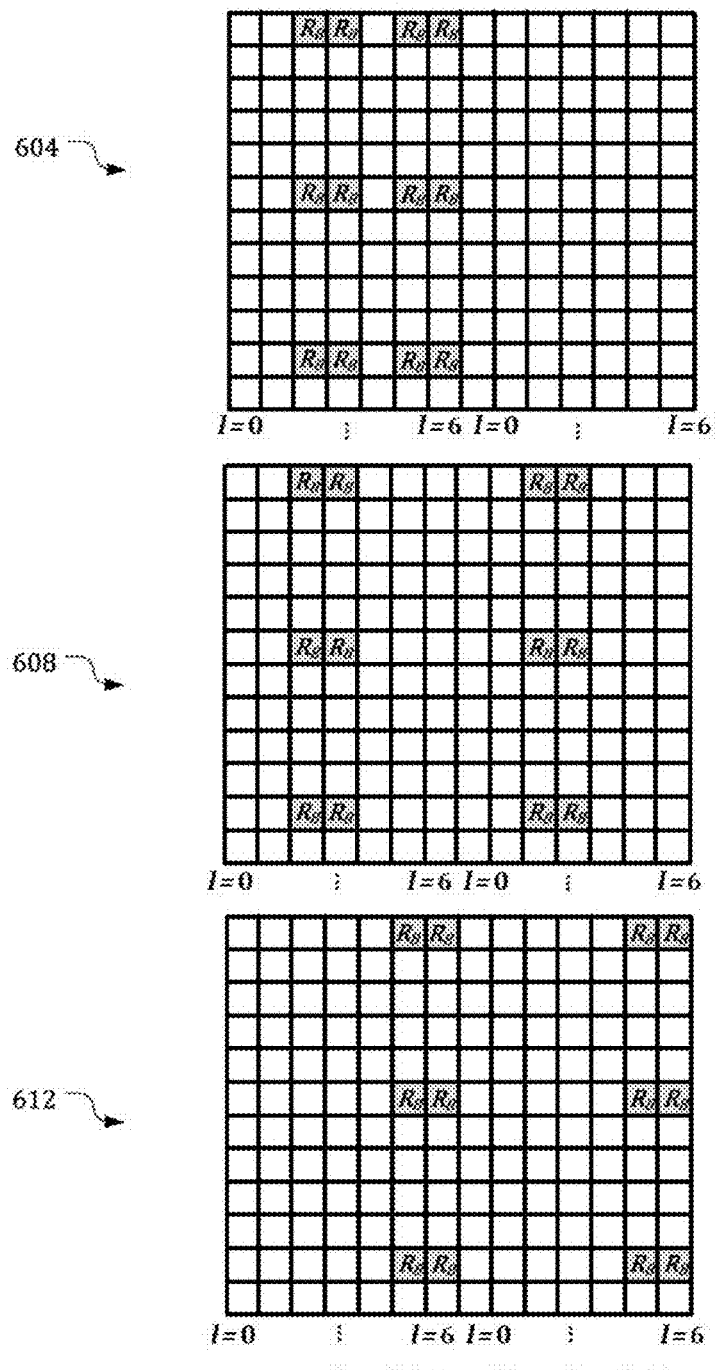
Figure 7:
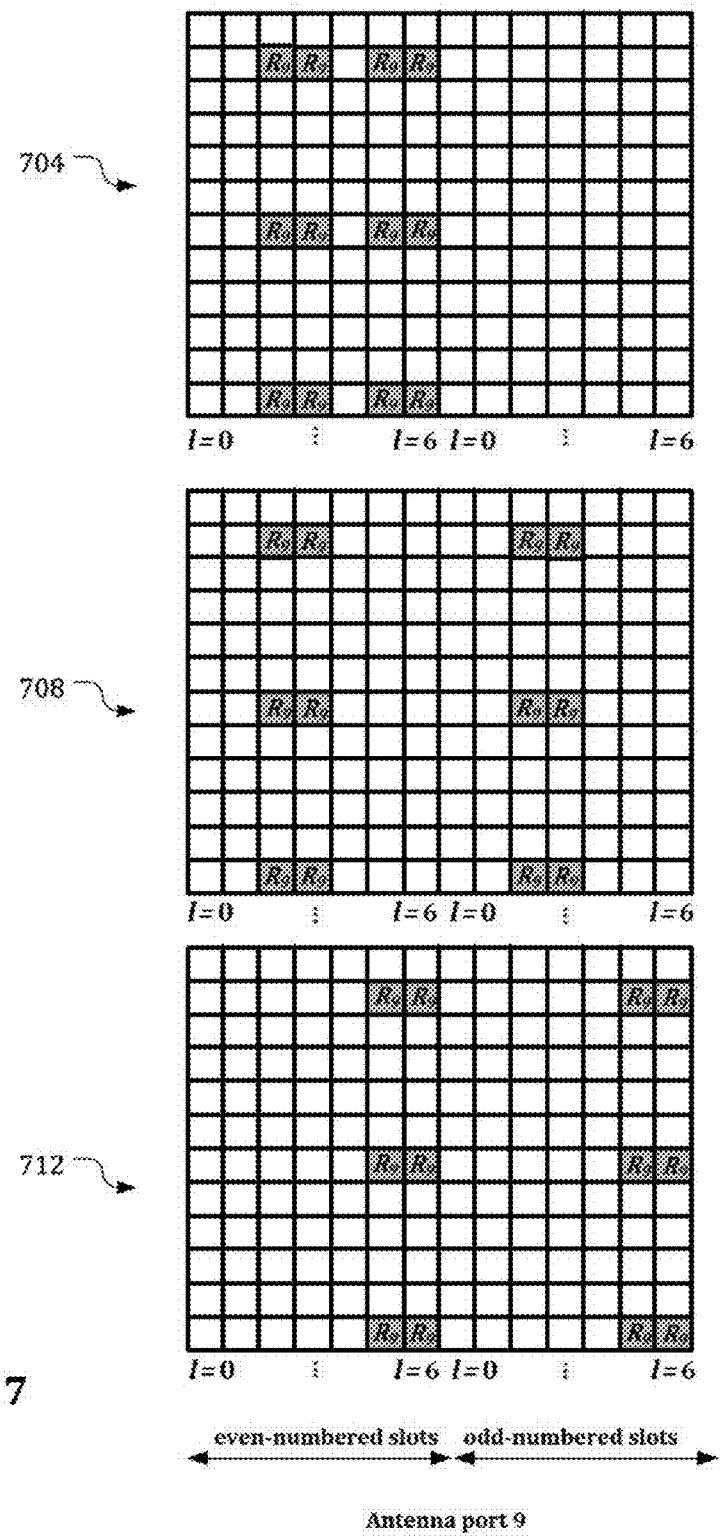
Figure 8:
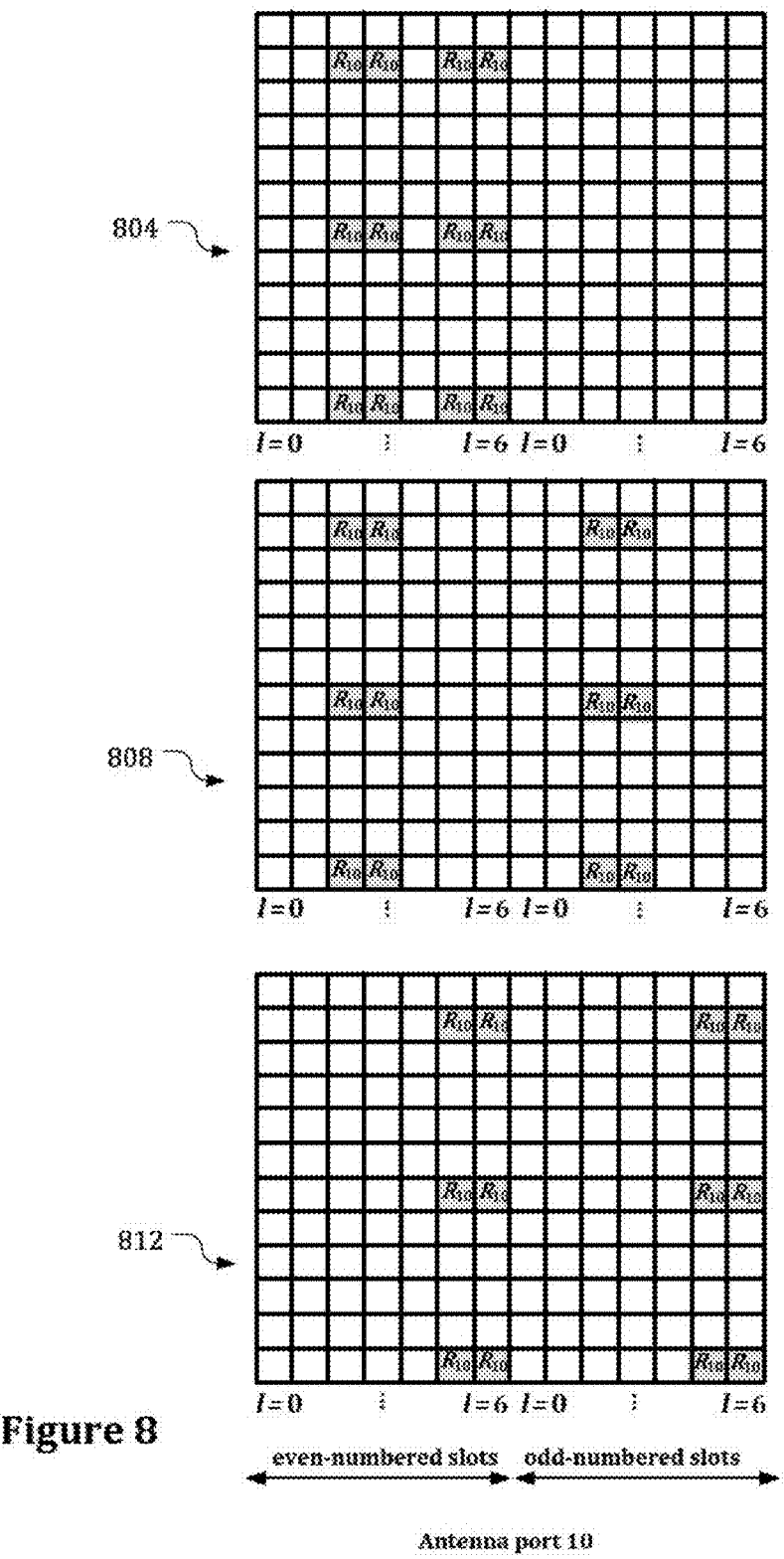
FIG. 8 illustrates a method in accordance with various embodiments.

FIGS. 5-8 illustrate example UE-RS patterns for an EPDCCH using normal CP in accordance with some embodiments. In particular, FIG. 5 illustrates a UE-RS pattern 504 for antenna port 7 with special subframe configurations 1, 2, 6, or 7; a UE-RS pattern 508 for antenna port 7 with special subframe configurations 3, 4, or 8; and a UE-RS pattern 512 for antenna port 7 with all other downlink subframes. FIG. 6 illustrates a UE-RS pattern 604 for antenna port 8 with special subframe configurations 1, 2, 6, or 7; a UE-RS pattern 608 for antenna port 8 with special subframe configurations 3, 4, or 8; and a UE-RS pattern 612 for antenna port 8 with all other downlink subframes. FIG. 7 illustrates a UE-RS pattern 704 for antenna port 9 with special subframe configurations 1, 2, 6, or 7; a UE-RS pattern 708 for antenna port 9 with special subframe configurations 3, 4, or 8; and a UE-RS pattern 712 for antenna port 9 with all other downlink subframes. FIG. 8 illustrates a UE-RS pattern 804 for antenna port 10 with special subframe configurations 1, 2, 6, or 7; a UE-RS pattern 808 for antenna port 10 with special subframe configurations 3, 4, or 8; and a UE-RS pattern 812 for antenna port 10 with all other downlink subframes.

For antenna ports p=7, p=8, or p=7, 8, ..., v+6, in a PRB with a frequency-domain index $n_{PRB}$ assigned for a corresponding PDSCH transmission, a part of the RS sequence r(m) may be mapped to complex-valued modulation symbols modulation symbols $a_{k,l}^{(p)}$ in a subframe, with normal CP, according to Equation 6, 7, or $$a_{k,l}^{(p)} = w_p(l') \cdot r(3 \cdot l' \cdot N_{RB}^{max,DL} + 3 \cdot n_{PRB} + m'). \qquad \text{Equation 10}$$

For localized EPDCCH, multiple-user (MU) MIMO may allow two UEs to share the same PRBs. In this case, two different antenna ports (for example, antenna ports 7 and 8) distinguished by CDM can be used for channel estimation for each UE. For example, antenna port 7 may be used by channel estimation circuitry of UE #0 and antenna port 8 may be used by channel estimation circuitry of UE #1 in order to estimate each channel. A pair of OFDM symbols, e.g., OFDM symbols 0, sharing the same resource but distinguished by CDM may be referred to as a CDM group. The channel estimation circuitry may determine which symbols of a CDM group are directed to respective UEs by performing a de-spreading operation based on an orthogonal cover code.

In some embodiments, a scrambling sequence generator of the scrambling circuitry 216, for example, may generate UE-RS for EPDCCH on antenna ports 7-10 by:

$$c_{int} = \left(\left\lfloor \frac{n_s}{2} \right\rfloor + 1\right) * (2X + 1) * 2^{16} + n_{SCID}, \qquad \text{Equation 11}$$

where X may be a virtual cell ID that is provided as a UE-specific RRC parameter with a range of 0-503 for an EPDCCH set. The channel estimation circuitry 404 may descramble the UE-RS using the virtual cell ID similar to that described above with respect to descrambling circuitry 228 descrambling the DCI.

If UE #0 uses antenna port 7 with X=X0 and UE #1 uses antenna port 8 with X=X1, the received signals for two adjacent OFDM symbols may be represented as follows:

$$R_0 = C_0^{UE\#0} \cdot W_7(0) \cdot H^{UE\#0} + C_0^{UE\#1} \cdot W_8(0) \cdot H^{UE\#1} \qquad \text{Equation 12}$$

$$R_1 = C_1^{UE\#0} \cdot W_7(1) \cdot H^{UE\#0} + C_1^{UE\#1} \cdot W_8(1) \cdot H^{UE\#1}, \qquad \text{Equation 13}$$

where: $R_0$ is a received signal at OFDM symbol 0; $R_1$ is a received signal at OFDM symbol 1; $C_0^{UE\#0}$ is a reference signal sequence at OFDM symbol 0 for UE #0 (initialized by X=X0); $C_1^{UE\#0}$ is a reference signal sequence at OFDM symbol 1 for UE #0 (initialized by X=X0); $C_0^{UE\#1}$ is a reference signal sequence at OFDM symbol 0 for UE #1 (initialized by X=X1); $C_1^{UE\#1}$ is a reference signal sequence at OFDM symbol 1 for UE #1 (initialized by X=X1); $W_7(0)$ is a Walsh code for antenna port 7 at OFDM symbol 0 ($W_7(0)=+1$); $W_7(1)$ is a Walsh code for antenna port 7 at OFDM symbol 1 ($W_7(1)=+1$); $W_8(0)$ is a Walsh code for antenna port 8 at OFDM symbol 0 ($W_8(0)=+1$); $W_8(1)$ is a Walsh code for antenna port 8 at OFDM symbol 1 ($W8(1)=-1$); $H^{UE\#0}$ is a channel for UE #0 experienced at antenna port 7; and $H^{UE\#1}$ is a channel for UE #1 experienced at antenna port 8.

It may be assumed that the channels for a UE in adjacent OFDM symbols are the same and a noise/interference term is omitted for ease of explanation. In some embodiments, channel estimation circuitry, for example channel estimation circuitry 404, may estimate $H^{UE\#0}$ at antenna port 7 for UE #0 by using the following receiver process:

$$\tilde{H}^{UE\#0} = R_0 \cdot (C_0^{UE\#0})^* \cdot (W_7(0))^* + R_1 \cdot (C_1^{UE\#0})^* \cdot (W_7(1))^*, \qquad \text{Equation 14}$$

wherein (.)* is a complex conjugate operation.

The channel estimation circuitry 404 may estimate $H^{UE\#1}$ at antenna port 8 for UE #1 by using the following receiver process:

$$\tilde{H}^{UE\#1} = R_0 \cdot (C_0^{UE\#1})^* \cdot (W_8(0))^* + R_1 \cdot (C_1^{UE\#1})^* \cdot (W_8(1))^* \quad \text{Equation 15}$$

From equations 12 and 13, equations 14 and 15 respectively become equations 16 and 17:

$$2 \cdot \tilde{H}^{UE\#0} = R_0 \cdot (C_0^{UE\#0})^* \cdot (W_7(0))^* + R_1 \cdot (C_1^{UE\#0})^* \cdot (W_7(1))^* = \quad \text{Equation 16}$$
$$(C_0^{UE\#0} \cdot W_7(0) \cdot H^{UE\#0} + C_0^{UE\#1} \cdot W_8(0) \cdot H^{UE\#1}) \cdot$$
$$(C_0^{UE\#0})^* \cdot (W_7(0))^* +$$
$$(C_0^{UE\#0} \cdot W_7(1) \cdot H^{UE\#0} + C_1^{UE\#1} \cdot W_8(1) \cdot H^{UE\#1}) \cdot$$
$$(C_1^{UE\#0})^* \cdot (W_7(1))^* =$$
$$2 \cdot H^{UE\#0} + (C_0^{UE\#1} \cdot W_8(0) \cdot H^{UE\#1} \cdot (C_0^{UE\#0})^* \cdot (W_7(0))^* +$$
$$C_1^{UE\#1} \cdot W_8(1) \cdot H^{UE\#1} \cdot (C_1^{UE\#0})^* \cdot (W_7(1))^*) =$$
$$2 \cdot H^{UE\#0} + (C_0^{UE\#1} \cdot H^{UE\#1} \cdot (C_0^{UE\#0})^* -$$
$$C_1^{UE\#1} \cdot H^{UE\#1} \cdot (C_1^{UE\#0})^*)$$

$$2 \cdot \tilde{H}^{UE\#1} = R_0 \cdot (C_0^{UE\#1})^* \cdot (W_8(0))^* + R_1 \cdot (C_1^{UE\#1})^* \cdot (W_8(1))^* = \quad \text{Equation 17}$$
$$(C_0^{UE\#0} \cdot W_7(0) \cdot H^{UE\#0} + C_0^{UE\#1} \cdot W_8(0) \cdot H^{UE\#1}) \cdot$$
$$(C_0^{UE\#1})^* \cdot (W_8(0))^* +$$
$$(C_1^{UE\#0} \cdot W_7(1) \cdot H^{UE\#0} + C_1^{UE\#1} \cdot W_8(1) \cdot H^{UE\#1}) \cdot$$
$$(C_1^{UE\#1})^* \cdot (W_8(1))^* =$$
$$2 \cdot H^{UE\#1} + (C_0^{UE\#0} \cdot W_7(0) \cdot H^{UE\#0} \cdot (C_0^{UE\#1})^* \cdot (W_8(0))^* +$$
$$C_1^{UE\#0} \cdot W_7(1) \cdot H^{UE\#0} \cdot (C_1^{UE\#1})^* \cdot (W_8(1))^*) =$$
$$2 \cdot H^{UE\#1} + (C_0^{UE\#0} \cdot H^{UE\#0} \cdot (C_0^{UE\#1})^* -$$
$$C_1^{UE\#0} \cdot H^{UE\#0} \cdot (C_1^{UE\#1})^*)$$

In order to estimate each channel by each UE, either of the following conditions should be fulfilled to cancel out the interference terms.

Condition 1) $C_0^{UE\#0} = C_0^{UE\#1}$ and $C_1^{UE\#0} = C_1^{UE\#1}$
Condition 2) $C_0^{UE\#0} = C_1^{UE\#0}$ and $C_0^{UE\#1} = C_1^{UE\#1}$.

Thus, condition 1 provides that a reference signal sequence at a first OFDM symbol for a first UE, using a first antenna port, is the same as a reference signal sequence at a first OFDM symbol for a second UE, using a second antenna port; and a reference signal sequence at a second OFDM symbol for the first UE is the same as a reference signal sequence at a second OFDM symbol for the second UE. With condition 1, the equations 16 and 17 respectively become equations 18 and 19:

$$2 \cdot \tilde{H}^{UE\#0} = 2 \cdot H^{UE\#0}; \quad \text{Equation 18}$$

and $$2 \cdot \tilde{H}^{EU\#1} = 2 \cdot H^{UE\#1}. \quad \text{Equation 19}$$

Condition 2, which may be implemented by Equation 10, provides that a reference signal sequence at a first OFDM symbol for a first UE, using a first antenna port, is the same as a reference signal sequence at a second OFDM symbol for the first UE; and a reference signal sequence at a first OFDM symbol for a second UE, using a second antenna port, is the same as a reference signal sequence at a second OFDM symbol for the second UE. With condition 2, the equations 19 and 20 respectively become equations 20 and 21:

$$2 \cdot \tilde{H}^{UE\#0} = 2 \cdot H^{UE\#0}; \quad \text{Equation 20}$$

and $$2 \cdot \tilde{H}^{UE\#1} = 2 \cdot H^{UE\#1}. \quad \text{Equation 21}$$

In this way, the channel estimation circuitries, e.g., channel estimation circuitry 404, may orthogonally estimate channels for each of the pair of UEs. The compensation circuitry 408 may receive an estimate of the channel from the channel estimation circuitry 404 and compensate a received signal (received from the channel estimation circuitry 404 or from elsewhere, e.g., an antenna). The compensated signal may be transmitted to other Rx circuitry, such as demodulating circuitry 224.

When condition 1 is implemented, the eNB 108 may pair MU-MIMO for two UEs having same RS sequences. The channel estimation circuitry 404 may assume that the same RS sequences are used for a pair of antenna ports, (for example antenna port 7 and antenna port 8) and may perform de-spreading operation on a received MU-MIMO signal based on the assumption in order to receive a desired symbol of a CDM group.

In some embodiments, the UE 104 may perform blind decoding of the EPDCCH based on the assumption that the same reference signal sequences r(m) are used at an RE within a CDM group (for example, antenna ports 7 and 8, 9 and 10, 11 and 13, or 12 and 14). Blind decoding may be performed by the UE in an attempt to determine which ECCEs convey the EPDCCH intended for the UE.

Figure 9:
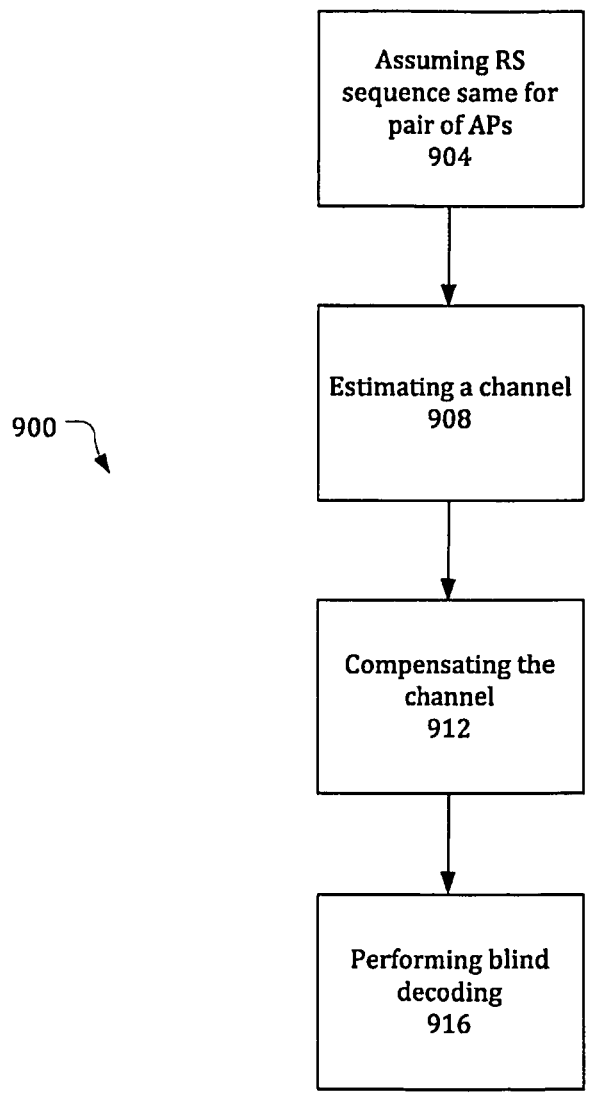
FIG. 9 schematically illustrates an example system that may be used to practice various embodiments described herein.

FIG. 9 illustrates a method 900 of blind decoding in accordance with an embodiment.

At 904, the method 900 may include assuming a reference signal sequence is same for pair of antenna ports. Thus, a reference signal sequence received for a first antenna port for communications between a UE and an eNB may also be used for communications of a second antenna port. The communications of the second antenna port may be between the eNB and another UE.

At 908, the method 900 may include estimating a channel. The estimating of the channel may be based on the assumption of 904.

At 912, the method 900 may include compensating a channel. The compensating of the channel may be based on the estimating of 908.

At 916, the method 900 may include performing a blind decoding based on the compensated channel (and therefore, based on the assuming that the reference signal sequence is the same for the first and second antenna ports). The performing of the blind decoding may include monitoring EPDCCH candidates associated with one or more of the pair of antenna ports.

Figure 10:
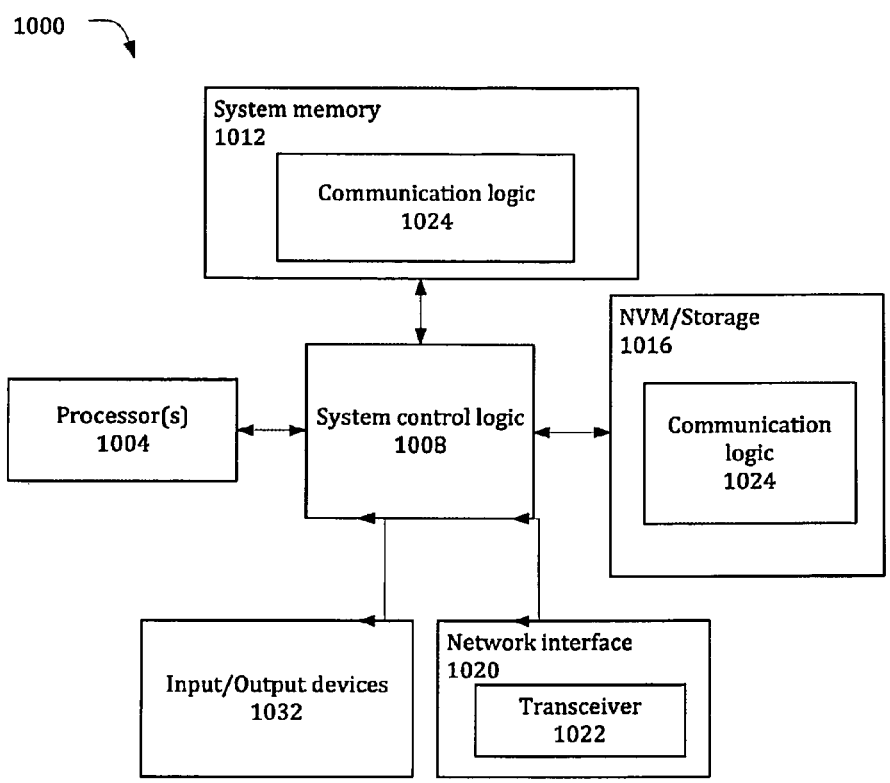

The UE 104 and eNB 108 described herein may be implemented into a system using any suitable hardware and/or software to configure as desired. FIG. 10 illustrates, for one embodiment, an example system 1000 comprising one or more processor(s) 1004, system control logic 1008 coupled with at least one of the processor(s) 1004, system memory 1012 coupled with system control logic 1008, non-volatile memory (NVM)/storage 1016 coupled with system control logic 1008, a network interface 1020 coupled with system control logic 1008, and input/output (I/O) devices 1032 coupled with system control logic 1008.

The processor(s) 1004 may include one or more single-core or multi-core processors. The processor(s) 1004 may include any combination of general-purpose processors and dedicated processors (e.g., graphics processors, application processors, baseband processors, etc.).

System control logic 1008 for one embodiment may include any suitable interface controllers to provide for any suitable interface to at least one of the processor(s) 1004 and/or to any suitable device or component in communication with system control logic 1008.

System control logic 1008 for one embodiment may include one or more memory controller(s) to provide an interface to system memory 1012. System memory 1012 may be used to load and store data and/or instructions, e.g., communication logic 1024. System memory 1012 for one embodiment may include any suitable volatile memory, such as suitable dynamic random access memory (DRAM), for example.

NVM/storage 1016 may include one or more tangible, non-transitory computer-readable media used to store data and/or instructions, e.g., communication logic 1024. NVM/storage 1016 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1016 may include a storage resource physically part of a device on which the system 1000 is installed or it may be accessible by, but not necessarily a part of, the device. For example, the NVM/storage 1016 may be accessed over a network via the network interface 1020 and/or over Input/Output (I/O) devices 1032.

The communication logic 1024 may include instructions that, when executed by one or more of the processors 1004, cause the system 1000 to perform operations associated with the components of the communication device 112 or 122 as described with respect to the above embodiments. In various embodiments, the communication logic 1024 may include hardware, software, and/or firmware components that may or may not be explicitly shown in system 1000.

Network interface 1020 may have a transceiver 1022 to provide a radio interface for system 1000 to communicate over one or more network(s) and/or with any other suitable device. In various embodiments, the transceiver 1022 may be integrated with other components of system 1000. For example, the transceiver 1022 may include a processor of the processor(s) 1004, memory of the system memory 1012, and NVM/Storage of NVM/Storage 1016. Network interface 1020 may include any suitable hardware and/or firmware. Network interface 1020 may include a plurality of antennas to provide a multiple input, multiple output radio interface. Network interface 1020 for one embodiment may include, for example, a wired network adapter, a wireless network adapter, a telephone modem, and/or a wireless modem.

For one embodiment, at least one of the processor(s) 1004 may be packaged together with logic for one or more controller(s) of system control logic 1008. For one embodiment, at least one of the processor(s) 1004 may be packaged together with logic for one or more controllers of system control logic 1008 to form a System in Package (SiP). For one embodiment, at least one of the processor(s) 1004 may be integrated on the same die with logic for one or more controller(s) of system control logic 1008. For one embodiment, at least one of the processor(s) 1004 may be integrated on the same die with logic for one or more controller(s) of system control logic 1008 to form a System on Chip (SoC).

In various embodiments, the I/O devices 1032 may include user interfaces designed to enable user interaction with the system 1000, peripheral component interfaces designed to enable peripheral component interaction with the system 1000, and/or sensors designed to determine environmental conditions and/or location information related to the system 1000.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1020 to communicate with components of a positioning network, e.g., a global positioning system (GPS) satellite.

In various embodiments, the system 1000 may be a mobile computing device such as, but not limited to, a laptop computing device, a tablet computing device, a netbook, a smartphone, etc. In various embodiments, system 1000 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Some non-limiting examples are provide below.

Example 1 includes apparatus to be employed in an enhance node B (eNB), the apparatus comprising: scrambling circuitry to receive a bit sequence that includes downlink control information (DCI) to be transmitted on an enhanced physical downlink control channel (EPDCCH) and to scramble the bit sequence based on a cell identifier to provide a scrambled bit sequence; and modulating circuitry coupled with the scrambling circuitry to receive the scrambled bits and to modulate the scrambled bits, with a quadrature phase shift keying modulation scheme, to provide a block of complex-valued modulation symbols.

Example 2 includes the apparatus of example 1, wherein a scrambling initialization seed includes the cell identifier, and the scrambling circuitry is to scramble the DCI bits based on the scrambling initialization seed.

Example 3 includes the apparatus of example 1, wherein the cell identifier is a virtual cell identifier provided to the scrambling circuitry by a radio resource control layer.

Example 4 includes the apparatus of example 3, wherein the DCI is to be transmitted in a first EPDCCH set, and the virtual cell identifier corresponds to the first EPDDCH set.

Example 5 includes the apparatus of example 3, further comprising:
a reference signal (RS) generator to generate demodulation reference signals associated with the EPDCCH based on the virtual cell identifier.

Example 6 includes the apparatus of example 1, wherein the cell identifier is a physical cell identifier.

Example 7 includes the apparatus of any of examples 1-6, further comprising: cyclic redundancy check (CRC) generating and masking circuitry to generate a bit sequence that includes DCI and CRC bits and to mask the bit sequence based on a radio network temporary identity (RNTI) of a user equipment that is an intended recipient of the DCI.

Example 8 includes the apparatus of any of examples 1-5, wherein the cell identifier is configured by radio resource control (RRC) signaling.

Example 9 includes an apparatus to be employed in a user equipment, the apparatus comprising: demodulating circuitry to receive complex-valued modulation symbols of an enhanced physical downlink control channel (EPDCCH) set that include downlink control information (DCI) and demodulate the complex-valued modulation symbols to provide a bit sequence; and descrambling circuitry coupled with the demodulating circuitry to descramble the bit sequence based on a initialization seed parameter that corresponds to the EPDCCH set to provide a descrambled bit sequence.

Example 10 includes the apparatus of example 9, wherein the initialization seed parameter is a virtual cell identifier and the descrambling circuit is configured to receive the virtual cell identifier from a radio resource control layer.

Example 11 includes the apparatus of example 10, wherein the demodulating circuitry is to receive complex-valued modulation symbols of another EPDCCH set and demodulate the complex-valued modulation symbols to provide another bit sequence; and the descrambling circuitry is to descramble the other bit sequence based on an initialization seed parameter that corresponds to the other EPDCCH set to provide another descrambled bit sequence.

Example 12 includes the apparatus of example 9, wherein the cell identifier is a physical cell identifier and the user equipment further comprises: control circuitry to: receive primary and secondary synchronization signals from an evolved Node B (eNB); determine the physical cell identifier based on the primary and secondary synchronization signals; and provide the physical cell identifier to the descrambling circuitry.

Example 13 includes the apparatus of any of examples 9-11, wherein the cell identifier is configured by radio resource control (RRC) signaling.

Example 14 includes an apparatus to be employed in an enhanced node B (eNB), the apparatus comprising: a reference signal (RS) generator to generate an RS sequence to be transmitted on a pair of orthogonal cover code (OCC) user equipment reference signal (UE-RS) resource elements (REs); and scrambling circuitry to use a common scrambling sequence for both REs.

Example 15 includes an apparatus of example 14, wherein the RS sequence is r(m) and is given by:

$$r(m) = \frac{1}{\sqrt{2}}(1 - 2*c(2m)) + j\frac{1}{\sqrt{2}}(1 - 2*c(2m+1)),$$

where $$m = \begin{cases} 0, 1, \ldots, 96N_{RB}^{max,DL} - 1 & \text{normal cyclic prefix} \\ 0, 1, \ldots, 128N_{RB}^{max,DL} - 1 & \text{extended cyclic prefix.} \end{cases}$$

Example 16 includes the apparatus of example 14, wherein the RS sequence is r(m), is to be transmitted by 2 antenna ports, and is given by:

$$r(m) = \frac{1}{\sqrt{2}}(1 - 2*c(2m)) + j\frac{1}{\sqrt{2}}(1 - 2*c(2m+1)),$$

where $$m = \begin{cases} 0, 1, \ldots, 24N_{RB}^{max,DL} - 1 & \text{normal cyclic prefix} \\ 0, 1, \ldots, 32N_{RB}^{max,DL} - 1 & \text{extended cyclic prefix.} \end{cases}$$

Example 17 includes the apparatus of example 14, further comprising: modulating circuitry to map at least part of the reference signal sequence r(m) to complex-valued modulation symbols $a_{k,l}^{(p)}$ in a subframe, using normal cyclic prefix according to:

$$a_{k,l}^{(p)} = w_p(l') \cdot r\left(3 \cdot \left\lfloor \frac{l'}{2} \right\rfloor \cdot N_{RB}^{max,DL} + 3 \cdot n_{PRB} + m'\right),$$

where:

$N_{RB}^{max,DL}$ is a maximum number of downlink resources elements in a resource block;

$$w_p(i) = \begin{cases} \overline{w}_p(i) & (m' + n_{PRB})\bmod 2 = 0 \\ \overline{w}_p(3-i) & (m' + n_{PRB})\bmod 1 = 0; \end{cases}$$

$$k = 5m' + N_{sc}^{RB} n_{PRB} + k';$$

$$k' = \begin{cases} 1 & p \in \{7, 8, 11, 13\} \\ 0 & p \in \{9, 10, 12, 14\}; \end{cases}$$

$$l = \begin{cases} l'\bmod 2 + 2 & \text{if in a special subframe with configuration 3, 4, 8 or 9} \\ l'\bmod 2 + 2 + 3\lfloor l'/2 \rfloor & \text{if in a special subframe with configuration 1, 2, 6 or 7} \\ l'\bmod 2 + 5 & \text{if not in a special subframe;} \end{cases}$$

$$l' = \begin{cases} 0, 1, 2, 3 & \text{if } n_s \bmod 2 = 0 \text{ and in a special subframe with configuration 1, 2, 6, or 7} \\ 0, 1 & \text{if } n_s \bmod 2 = 0 \text{ and not in special subframe with configuration 1, 2, 6, or 7; and} \\ 2, 3 & \text{if } n_s \bmod 2 = 1 \text{ and not in special subframe with configuration 1, 2, 6, or 7} \end{cases}$$

Example 18 includes the apparatus of any of examples 14-17, wherein the common scrambling sequence is based on a virtual cell identifier.

Example 19 includes the apparatus of example 18, further comprising: a radio resource control layer to provide the scrambling circuitry with the virtual cell identifier.

Example 20 includes an apparatus to be employed in a user equipment, the apparatus comprising: channel estimation circuitry to receive a reference signal sequence for a first antenna port on an orthogonal frequency division multiplexing (OFDM) symbol, and estimate a channel for the first antenna port for the UE based on the received reference signal sequence and an assumption that the reference signal sequence is transmitted to another UE for a second antenna port; and channel compensation circuitry coupled with the channel estimation circuitry to receive an estimate of the channel and compensate a received signal.

Example 21 includes the apparatus of example 20, wherein the channel estimation circuitry is to perform a de-spreading operation on a received signal based on the assumption.

Example 22 includes the apparatus of example 21, wherein the de-spreading operation is based on an orthogonal cover code.

Example 23 includes one or more computer-readable media having instructions that, when executed, cause a user equipment to: assume a reference signal sequence received for a first antenna port for communications between the UE and an enhanced node B is also used for communications of a second antenna port; perform a blind decoding operation for enhanced physical downlink control channel (EPDCCH) based on said assumption.

Example 24 includes the one or more computer-readable media of example 23, wherein the instructions, when executed, further cause the user equipment to: process the reference signal sequence for the first antenna port on an orthogonal frequency division multiplexing (OFDM) symbol; and estimate a channel for the first antenna port for the UE based on the reference signal sequence and assumption that the reference signal sequence is also used for communications of a second antenna port.

Example 25 includes the one or more computer-readable media of example 24, wherein the instructions, when executed, further cause the user equipment to: compensate a received signal based on the estimate of the channel.

Example 26 includes an apparatus to be employed in a user equipment, the apparatus comprising: means for assuming a reference signal sequence received for a first antenna port for communications between the UE and an enhanced node B is also used for communications of a second antenna port; performing a blind decoding operation for enhanced physical downlink control channel (EPDCCH) based on said assumption.

Example 27 includes an apparatus of example 26, further comprising: means for processing the reference signal sequence for the first antenna port on an orthogonal frequency division multiplexing (OFDM) symbol; and means for estimating a channel for the first antenna port for the UE based on the reference signal sequence and assumption that the reference signal sequence is also used for communications of a second antenna port.

Example 28 includes the apparatus of example 26, further comprising: means for compensating a received signal based on the estimate of the channel.

Example 29 a method comprising: receiving complex-valued modulation symbols of an enhanced physical downlink control channel (EPDCCH) set that include downlink control information (DCI) and demodulate the complex-valued modulation symbols to provide a bit sequence; and descrambling the bit sequence based on a initialization seed parameter that corresponds to the EPDCCH set to provide a descrambled bit sequence.

Example 30 includes the method of example 29, wherein the initialization seed parameter is a virtual cell identifier and the method further comprises receiving the virtual cell identifier from a radio resource control layer.

Example 31 includes the method of any of examples 29-30, wherein the cell identifier is configured by radio resource control (RRC) signaling.

Example 32 includes an apparatus to be employed in an enhanced node B (eNB), the apparatus comprising: means for generating an RS sequence to be transmitted on a pair of orthogonal cover code (OCC) user equipment reference signal (UE-RS) resource elements (REs); and means for scrambling both REs using a common scrambling sequence.

Example 33 includes the apparatus of example 32, wherein the RS sequence is r(m) and is given by:

$$r(m) = \frac{1}{\sqrt{2}}(1 - 2*c(2m)) + j\frac{1}{\sqrt{2}}(1 - 2*c(2m+1)),$$

where $$m = \begin{cases} 0, 1, \ldots, 96N_{RB}^{max,DL} - 1 & \text{normal cyclic prefix} \\ 0, 1, \ldots, 128N_{RB}^{max,DL} - 1 & \text{extended cyclic prefix} \end{cases}$$

or where $$m = \begin{cases} 0, 1, \ldots, 24N_{RB}^{max,DL} - 1 & \text{normal cyclic prefix} \\ 0, 1, \ldots, 32N_{RB}^{max,DL} - 1 & \text{extended cyclic prefix} \end{cases}$$

Example 34 includes the apparatus of example 32, further comprising: modulating circuitry to map at least part of the reference signal sequence r(m) to complex-valued modulation symbols $a_{k,l}^{(p)}$ in a subframe, using normal cyclic prefix according to:

$$a_{k,l}^{(p)} = w_p(l') \cdot r\left(3 \cdot \left\lfloor \frac{l'}{2} \right\rfloor \cdot N_{RB}^{max,DL} + 3 \cdot n_{PRB} + m'\right),$$

where:
$N_{RB}^{max,DL}$ is a maximum number of downlink resources elements in a resource block:

$$w_p(i) = \begin{cases} \bar{w}_p(i) & (m' + n_{PRB})\bmod 2 = 0 \\ \bar{w}_p(3-i) & (m' + n_{PRB})\bmod 1 = 0; \end{cases}$$

$$k = 5m' + N_{sc}^{RB} n_{PRB} + k';$$

-continued $$k' = \begin{cases} 1 & p \in \{7, 8, 11, 13\} \\ 0 & p \in \{9, 10, 12, 14\}; \end{cases}$$

$$l = \begin{cases} l' \bmod 2 + 2 & \text{if in a special subframe with configuration 3, 4, 8 or 9} \\ l' \bmod 2 + 2 + 3\lfloor l'/2 \rfloor & \text{if in a special subframe with configuration 1, 2, 6 or 7} \\ l' \bmod 2 + 5 & \text{if not in a special subframe;} \end{cases}$$

$$l' = \begin{cases} 0, 1, 2, 3 & \text{if } n_s \bmod 2 = 0 \text{ and in a special subframe with configuration 1, 2, 6, or 7} \\ 0, 1 & \text{if } n_s \bmod 2 = 0 \text{ and not in special subframe with configuration 1, 2, 6, or 7; and} \\ 2, 3 & \text{if } n_s \bmod 2 = 1 \text{ and not in special subframe with configuration 1, 2, 6, or 7} \end{cases}$$

Example 35 includes the apparatus of any of examples 32-34, wherein the common scrambling sequence is based on a virtual cell identifier.

Example 36 includes a method comprising: assuming, by a user equipment, a reference signal sequence received for a first antenna port for communications between the UE and an enhanced node B is also used for communications of a second antenna port; performing a blind decoding operation for enhanced physical downlink control channel (EPDCCH) based on said assuming.

Example 37 includes the method of example 36, further comprising: receiving the reference signal sequence for the first antenna port on an orthogonal frequency division multiplexing (OFDM) symbol; and estimating a channel for the first antenna port for the UE based on receiving of the reference signal sequence and assuming the reference signal sequence is also used for communications of a second antenna port.

Example 38 includes the method of example 37, further comprising: compensating a received signal based on the estimating of the channel.

What is claimed is:

1. An apparatus to be employed in an enhance node B (eNB), the apparatus comprising:
    scrambling circuitry to receive a bit sequence that includes downlink control information (DCI) to be transmitted on an enhanced physical downlink control channel (EPDCCH) and to scramble the bit sequence based on a cell identifier to provide a scrambled bit sequence; and
    modulating circuitry coupled with the scrambling circuitry to receive the scrambled bits and to modulate the scrambled bits, with a quadrature phase shift keying modulation scheme, to provide a block of complex-valued modulation symbols,
    wherein the cell identifier is a virtual cell identifier;
    the DCI is to be transmitted in a first EPDCCH set;
    the virtual cell identifier corresponds to the first EPDDCH set; and
    the scrambling circuitry is to scramble the DCI bits based on a scrambling initialization seed $c_{int}$ given by $$c_{int} = \lfloor n_s/2 \rfloor * 2^9 + N_{ID}^{ePDCCH}$$

where $n_s$ is a slot number within a radio frame and $N_{ID}^{ePDCCH}$ is the virtual cell identifier.

2. The apparatus of claim 1, wherein the cell identifier is a provided to the scrambling circuitry by a radio resource control layer.

3. The apparatus of claim 2, further comprising:
    a reference signal (RS) generator to generate demodulation reference signals associated with the EPDCCH based on the virtual cell identifier.

4. The apparatus of claim 1, further comprising:
    cyclic redundancy check (CRC) generating and masking circuitry to generate a bit sequence that includes DCI and CRC bits and to mask the bit sequence based on a radio network temporary identity (RNTI) of a user equipment that is an intended recipient of the DCI.

5. The apparatus of claim 1, wherein the cell identifier is configured by radio resource control (RRC) signaling.

6. The apparatus of claim 1, wherein the apparatus is a mobile device that includes a touchscreen display and one or more cameras.

* * * * *